United States Patent
Fujibayashi

(10) Patent No.: US 6,948,089 B2
(45) Date of Patent: Sep. 20, 2005

(54) APPARATUS AND METHOD FOR MULTIPLE GENERATION REMOTE BACKUP AND FAST RESTORE

(75) Inventor: Akira Fujibayashi, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 499 days.

(21) Appl. No.: 10/044,274

(22) Filed: Jan. 10, 2002

(65) Prior Publication Data

US 2003/0131278 A1 Jul. 10, 2003

(51) Int. Cl.$^7$ ............................................. G06F 11/00
(52) U.S. Cl. ........................ 714/6; 714/15; 714/20
(58) Field of Search ............................ 714/6, 15, 20; 711/161, 162

(56) References Cited

U.S. PATENT DOCUMENTS

| | | | | |
|---|---|---|---|---|
| 5,430,866 A | * | 7/1995 | Lawrence et al. | 714/20 |
| 5,678,042 A | | 10/1997 | Pisello et al. | |
| 5,745,753 A | | 4/1998 | Mosher, Jr. | |
| 6,101,497 A | | 8/2000 | Ofek | |
| 6,131,148 A | * | 10/2000 | West et al. | 711/162 |
| 6,209,002 B1 | | 3/2001 | Gagne et al. | |
| 6,594,744 B1 | * | 7/2003 | Humlicek et al. | 711/162 |
| 6,606,694 B2 | * | 8/2003 | Carteau | 711/162 |
| 6,651,075 B1 | * | 11/2003 | Kusters et al. | 707/204 |
| 6,654,912 B1 | * | 11/2003 | Viswanathan et al. | 714/42 |
| 6,691,245 B1 | * | 2/2004 | DeKoning | 714/6 |
| 6,718,352 B1 | * | 4/2004 | Dang et al. | 707/205 |
| 2002/0083366 A1 | * | 6/2002 | Ohran | 714/13 |

OTHER PUBLICATIONS

Distributed file system—a Whatis.com definition, date not given, Whatis.com, http://searchsmallbizit.techtarget.com/sDefinition/0,,sid44_gci496997,00.html.*

Software Solutions Guide for Enterprise Storage, Hitachi Freedom Storage, Hitachi Data Systems; Consists of Table of Contents and pp. 1–83; Printed Jan. 9, 2002.

* cited by examiner

Primary Examiner—Robert Beausoliel
Assistant Examiner—Marc M Duncan
(74) Attorney, Agent, or Firm—Squire, Sanders & Dempsey, L.L.P.

(57) ABSTRACT

A method for remote backup includes: mirroring data from a primary storage device at a first location to a secondary storage device at a second location; taking a snapshot of the primary storage device and of the secondary storage device; storing the primary storage device snapshot on a first snapshot volume at the first location; storing the secondary storage device snapshot on a second snapshot volume at the second location; updating a data structure to record backup times for the first and second snapshots and to record locations of the snapshots on the snapshot volumes; and repeating the above so as to store multiple generations of snapshots. A method for fast restore uses a selected snapshot located at the first location to restore data. If the selected snapshot at the first location is not available, the selected snapshot at the second location is used.

5 Claims, 4 Drawing Sheets

FIG. 2

Remote Host 115
- Control Manager Engine 200
- Table of Contents 210

FIG. 3

Table of Contents 210

Primary Volume 300

| Pair ID# | Pair Name | Pair Group Name | Primary Volume | Snapshot Volume | Backup Start Time | Backup End Time |
|---|---|---|---|---|---|---|
| 0 | | | | | | |
| 1 | | | | | | |
| N | | | | | | |

Secondary Volume 310

| Pair ID# | Pair Name | Pair Group Name | Seconday Volume | Snapshot Volume | Backup Start Time | Backup End Time |
|---|---|---|---|---|---|---|
| 0 | | | | | | |
| 1 | | | | | | |
| N | | | | | | |

APPARATUS AND METHOD FOR MULTIPLE GENERATION REMOTE BACKUP AND FAST RESTORE

FIELD OF THE INVENTION

The present invention relates generally to techniques for remote backup, and in particular, but not exclusively, to techniques for multiple generation remote backup and fast restore capability.

BACKGROUND OF THE INVENTION

Conventionally, remote backup systems enable multiple generations of backups (e.g., snapshot images) of data from a primary site to be mirrored (e.g., stored) at a secondary site in a different geographic area from the primary site. An advantage of remote backup is that it enables a customer to survive a disaster that could destroy data stored at the primary site. Disasters may be man-made, such as power outages, fires, etc.; natural disasters, such as earthquakes, volcanic eruptions, storms, etc.; man-made political disasters, such as riots or terrorist acts, etc.; or some combination of disaster types. By locating data backups remotely, a customer can survive a disaster by restoring data using backed up data mirrored in a remote location that was unaffected by the disaster.

For example, a primary site may be located in California, which occasionally suffers earthquakes. Accordingly, a customer may have a remote backup at a secondary site in a different state that is unaffected by earthquakes. Therefore, if an earthquake does destroy data stored at the primary site, the customer's operations can survive by restoring the destroyed data using backed up data from the secondary (remote) site.

However, as there is usually a significant distance between the primary and secondary sites, it may take a long time to restore lost data from the secondary to primary site. For example, a primary and secondary site may be linked together via a SAN connection, which has a slower data transfer rate as compared to a local connection. Therefore, a restore may take several hours, or even longer, if a large amount of data was lost in a disaster.

Accordingly, a new system and method is needed to enable a customer to restore data quickly.

SUMMARY OF THE INVENTION

The present invention provides systems and techniques for multiple generation remote backup and fast restore. In one embodiment of the invention, a network topography includes a local host communicatively coupled to a primary storage device at a local storage location, and a secondary storage device, communicatively coupled to the primary storage device, at a remote location. The topography further includes multiple volumes at both the local storage location and remote location for storing snapshots of the primary storage device and secondary storage device respectively.

A system according to an embodiment of the invention includes a control manager engine communicatively coupled to both the primary storage device and secondary storage device. The engine resides at the same location as the primary or secondary storage device or at a third location. The engine makes a remote backup of the primary storage device at the second storage device. After making a backup of the primary storage device, the engine makes a snapshot backup of both the primary and secondary storage devices leading to identical snapshot backups. One snapshot backup is stored on a snapshot volume at the same location as the primary storage device and the other snapshot backup is stored on a snapshot volume at the same location as the secondary storage device. In addition, multiple generations of snapshot backups may be created over time in a similar manner.

To recover data (e.g., after a disaster that causes a data loss) on the primary storage device, a user selects which generation of snapshot backups to use to restore data. After selection, the engine determines whether the selected generation snapshot is stored locally and is viable. If the locally stored snapshot is viable, the engine restores the primary storage device using the locally stored snapshot, which is faster than conventionally restoring using a remote snapshot. If the local snapshot is not available, then a remotely stored snapshot is used to restore the primary storage device. Accordingly, the engine first tries to restore data using a locally stored snapshot, thereby performing a faster restore than if using a remotely stored backup due to faster transmission times for restoring from a local volume compared to a remote volume.

A backup technique according to an embodiment of the invention comprises: backing up the primary storage device to a secondary storage device at a remote location; making a snapshot backup of the secondary storage device at the remote location; making a snapshot backup of the primary storage device at the local location; and repeating the above to create additional generations of snapshots over time so that for each generation an identical snapshot will reside at both local and remote sites.

A restore technique according to an embodiment of the invention comprises: determining a snapshot generation to use to restore data to a primary storage device; determining if the snapshot generation is located at the local location and is viable; if the snapshot is located locally and viable, restoring the data to the primary storage device using the local snapshot; if the snapshot is not located locally, restoring data to the secondary storage device from the remotely stored snapshot and then restoring data to the primary storage device from the secondary storage device.

Accordingly, the backup and restore system and techniques enable faster restore of data when a viable snapshot resides locally. These and other benefits are described throughout the present specification. A further understanding of the nature and advantages of the invention herein may be realized by reference to the remaining portions of the specification and the attached drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 illustrates a block diagram of the remote host of FIG. 1;

FIG. 3 illustrates a block diagram of a table of contents of the remote host of FIG. 1;

DESCRIPTION OF THE SPECIFIC EMBODIMENTS

The following description is provided to enable any person skilled in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
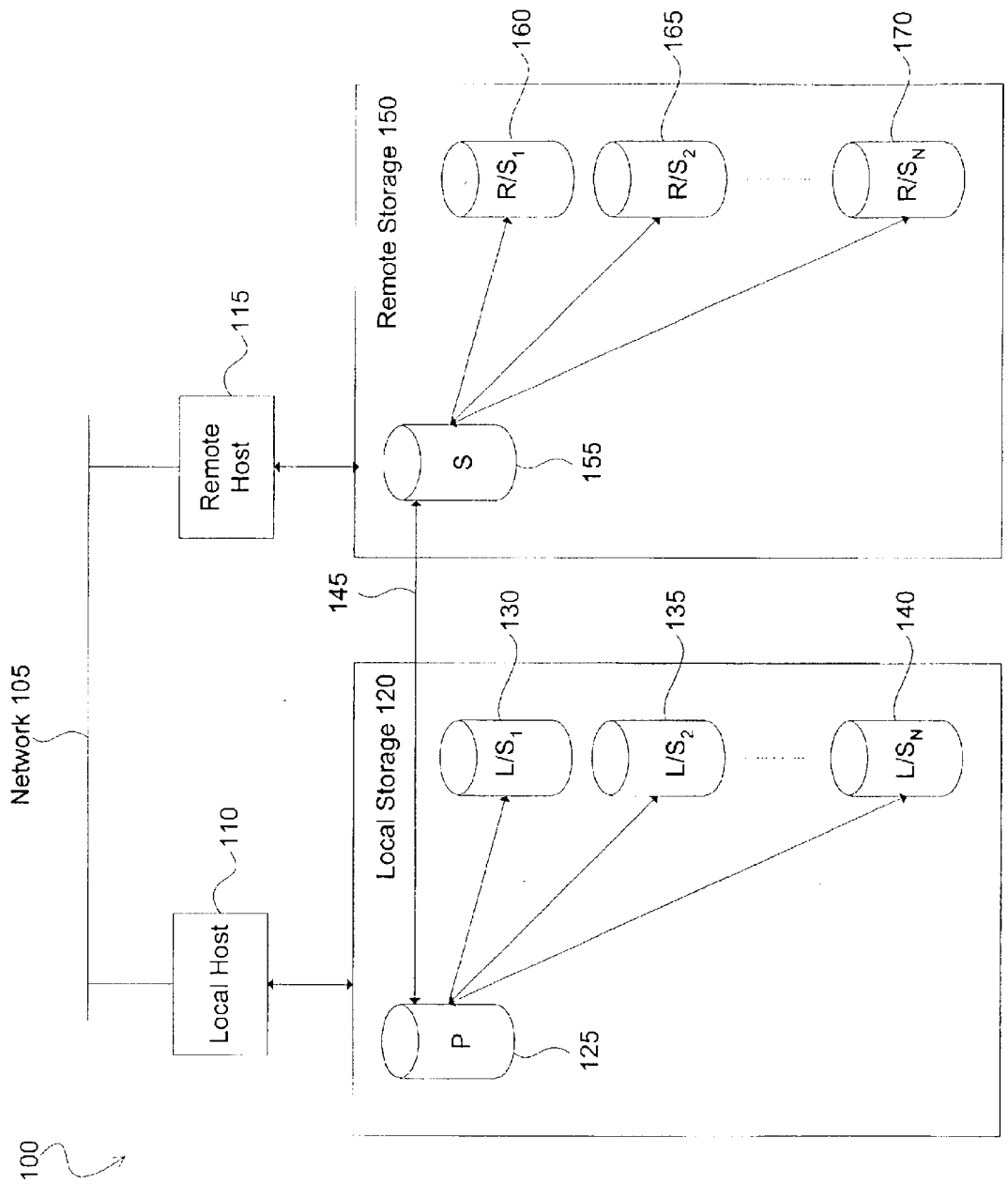
FIG. 1 illustrates a block diagram of a network topography in accordance with a particular embodiment of the present invention.

FIG. 1 illustrates a block diagram of a network topography 100 in accordance with a particular embodiment of the present invention. Topography 100 includes a local host 110 communicatively coupled a network 105, such as the Internet, and to local storage 120. Further, the topography includes a remote host 105 communicatively coupled to a network 105 and to remote storage 150. In one embodiment of the invention, remote storage 150 is directly communicatively coupled to local storage 120 via a network connection 145. Local storage 120 includes a primary storage device 125 for storing data generated and/or used by local host 110. Remote storage 150 includes a secondary storage device 155 for storing a backup of primary storage device 125. Local storage 120 and remote storage 150 may also each include additional devices (volumes) for storing snapshots of primary storage device 125 and secondary storage device 155 respectively, such as local snapshot volume 1 (L/S$_1$) 130 to L/S$_N$ 140 locally and remote snapshot volume 1 (R/S$_1$) 160 to R/S$_N$ 170 remotely.

Remote host 115, which will be discussed in further detail in conjunction with FIG. 2, may be located at the same geographic location as remote storage 150, local storage 120, or at a third location. Remote host 115 includes a control manager engine 200 (FIG. 2). The engine 200, as will be discussed further below, backs up (e.g., synchronizes) data from primary storage device 125 to secondary storage 155. In addition, engine 200 can form multiple generations of snapshot backups of primary storage device 125 and second storage device 155 over time. For example, L/S$_1$ 130, L/S$_2$ 135 to L/S$_N$ 140 each hold different snapshots of primary storage device 125 as a function of time and possibly other variables. Similarly, R/S$_1$ 160 holds a snapshot of secondary storage device 155 that is identical to the snapshot on L/S$_1$ 130. Similarly, the snapshots on R/S$_2$ 165 to R/S$_N$ are identical to snapshots on L/S$_2$ 135 to L/S$_N$ respectively.

In an embodiment of the invention, primary storage device 125 may be communicatively coupled to secondary storage device 155 via a storage area network (SAN), local SAN, Global SAN, remote local SAN, (not shown) or a plurality of SANs. Similarly, local host 110 may be communicatively coupled to remote host 115 via one or more SANs. Further, in an embodiment of the invention, topology 100 includes additional hosts and/or storage devices.

FIG. 2 illustrates a block diagram of the remote host 115 of FIG. 1. Remote host 115 includes a control manager engine 200 and table of contents (TOC) 210. Control manager engine 200 performs backup and restore functions using TOC 210, which is a data structure that holds data on snapshot backup locations and times. While TOC 210 is referred to as a table, one of ordinary skill in the art will recognize that TOC 210 can take the form of any type of data structure. TOC 210 will be discussed in further detail in conjunction with FIG. 3.

Control manager engine 200 backs up primary storage device 125 by first synchronizing data from primary storage device 125 to secondary storage 155; terminating the connection 145 between primary storage device 125 and secondary storage 155; creating snapshots of the primary storage device 125 and secondary storage device 155 simultaneously so that the primary snapshot and secondary snapshot are identical; storing the snapshot of the primary storage device 125 at a local location; storing the snapshot of the secondary storage device 155 at a remote location; and updating TOC 210. In an embodiment of the invention, engine 200 creates multiple generations of snapshots (e.g., snapshots as a function of time) to enable later restoration of data from a specific time. If there are multiple snapshot volumes at the remote and locate sites, the engine 200 stores new snapshots on the snapshot volumes holding the oldest snapshots, thereby replacing the oldest snapshots. In another embodiment, the engine 200 enables a user to select the snapshot volumes to use (and therefore which snapshots to delete) to store the newly-created snapshots.

To restore data, a user first selects a snapshot generation to use to restore data. In another embodiment of the invention, the engine 200 may automatically select a pre-specified snapshot generation, such as the most recent generation, to use to restore data. The engine 200 then disconnects the connection 145 between primary storage device 125 and secondary storage 155; determines if the selected snapshot generation is stored locally and is viable; if the selected snapshot generation is stored locally and viable, restores data to the primary storage device 125 using the locally stored selected snapshot generation; if the selected snapshot generation is not stored locally, restores data to secondary storage device 155 using the remotely stored selected snapshot generation, reestablishes connection 145, and then restores data from the secondary storage device 155 to primary storage device 125 over connection 145.

FIG. 3 illustrates a block diagram of TOC 210 of the remote host 115 (FIG. 1). TOC 210 comprises two data structures 300 and 310 corresponding to the primary storage device 125 and secondary storage device 155 respectively. In one embodiment of the invention, data structure 300 includes, for each primary storage 125/local snapshot pair, data on backups made, such as pair name (e.g., primary storage device 125 and secondary storage device 155 pair name); pair group name; primary volume identifier; local snapshot volume identifier; backup start time and backup end time.

Data structure 310 includes, for each primary storage 125/local snapshot pair, data on backups made, such as pair name (e.g., primary storage device 125 and secondary storage device 155 pair name); pair group name; secondary volume identifier; remote snapshot volume identifier; backup start time and backup end time.

Figure 4:
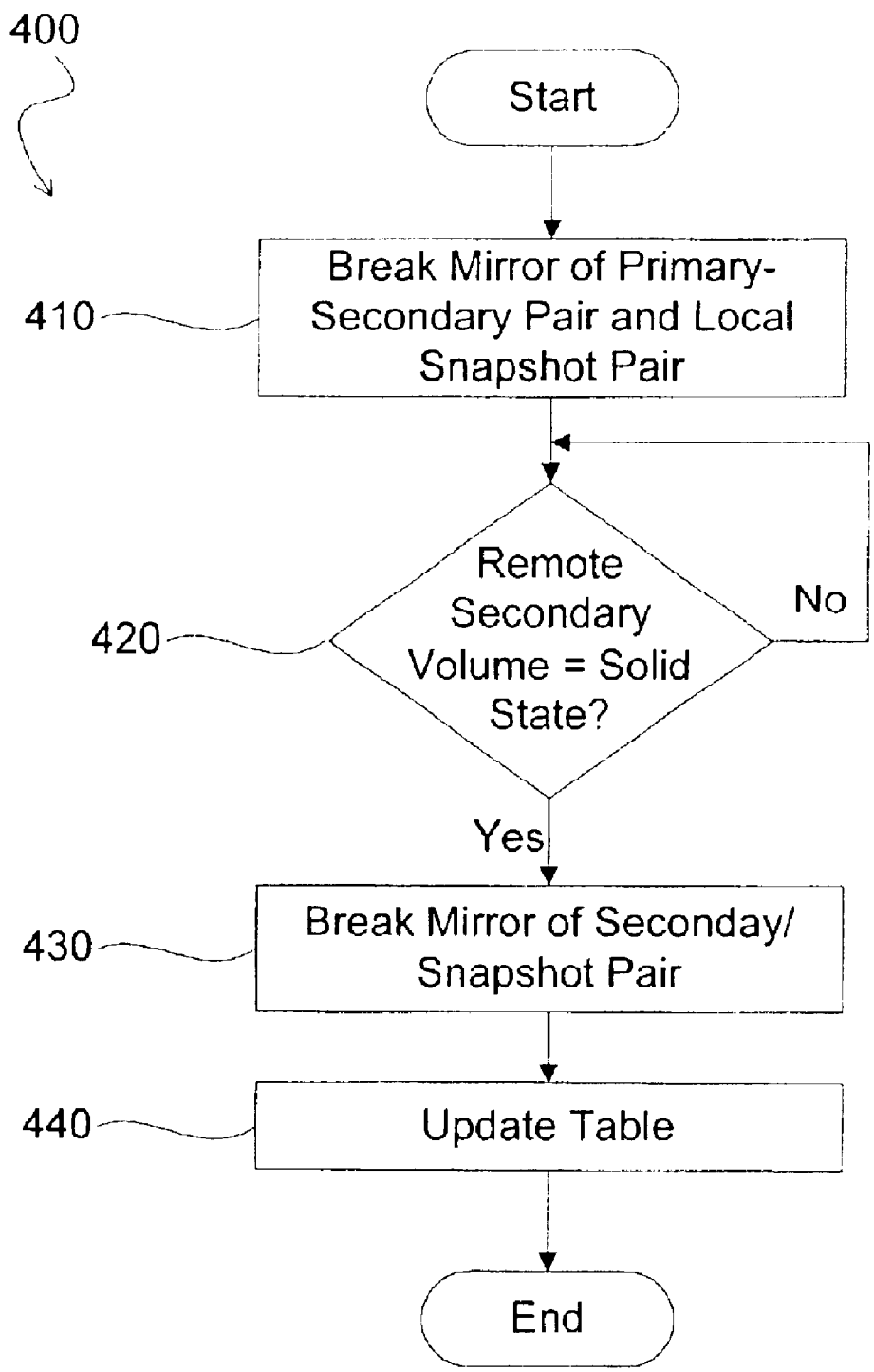
FIG. 4 is a flowchart illustrating a backup method according to an embodiment of the invention.

FIG. 4 is a flowchart illustrating a backup method 400 according to an embodiment of the invention. First, engine 200 temporarily breaks (410) the mirror between primary storage device 125 and secondary storage device 155 (i.e., temporarily stopping copying from primary storage device 125 to secondary storage device 155) so that no data is passed between primary storage device 125 and secondary storage device 155. In addition, engine 200 temporarily breaks (410) the mirror between primary storage device 125 and a selected local snapshot volume, such as L/S$_1$ 130 to L/S$_N$ 140 so that no new snapshots are created. Further, once the mirror between storage device 125 and the selected local snapshot volume is broken, the selected local snapshot volume contains an identical copy (e.g. snapshot) of the primary storage device 125. However, if this is a first backup made, there will be no backups of primary storage device 125 at secondary storage device 155 and there will be no backups between primary storage device 125 at local snapshot volumes. Accordingly, if this is a first backup (as indicated by an empty TOC 210), all local snapshot volumes and remote snapshot volumes can be mirrored.

Next, the engine 200 determines (420) if the secondary storage device 155 is solid state, i.e., no pending data to be copied from primary storage device 125. If the secondary storage device 155 is not solid state, the engine 200 waits until the secondary storage device 155 is solid state. After the secondary storage device 155 is solid state, the engine 200 temporarily breaks (430) or disconnects the mirror between secondary storage device 155 and a selected remote snapshot volume, such as $R/S_1$ 160 to $R/S_N$ 170, so that no new snapshots can be created. When the secondary storage device 155 is in solid state, the device 155 contains an identical copy of primary storage device 125. Further, once the mirror between the selected local snapshot and secondary storage device 155 is broken, the local snapshot that was mirrored with the secondary storage device 155 also contains an identical copy (e.g., snapshot) of the primary storage device 125. In an embodiment of the invention, a user can specify which snapshot volume to use. In another embodiment, or if the user does not specify a snapshot volume to use, engine 200 can store the snapshot on a volume holding the oldest snapshot thereby deleting the oldest snapshot.

After breaking (430) the mirrors between the secondary storage device 155 and the selected remote snapshot volume, the engine 200 updates (440) TOC 210 to reflect the backups (e.g., records backup start and end time as well volume identifiers where the snapshots were stored). The method 400 then ends. In an embodiment, the engine 200 can also restore the mirror between the primary storage device 125 and the remote storage device 155 after updating (440) the TOC 210.

In an alternative embodiment of method 400, the mirror between the primary storage device 125 and secondary storage device 155 is continuously broken and the secondary storage device 155 may include a previous backup of primary storage device 125. Engine 200 then takes a snapshot of secondary storage device 155 and flushes out the data stored on device 155. The engine 200 can then synch (i.e., enable the mirror between) the pair of primary storage device 125 and secondary storage device 155 and then again break (410) the mirror and determine (420) if the secondary storage device 155 is solid state. After the secondary storage device 155 is solid state, the engine 200 updates (440) the TOC 210 including updating content records for the secondary storage device.

Figure 5:
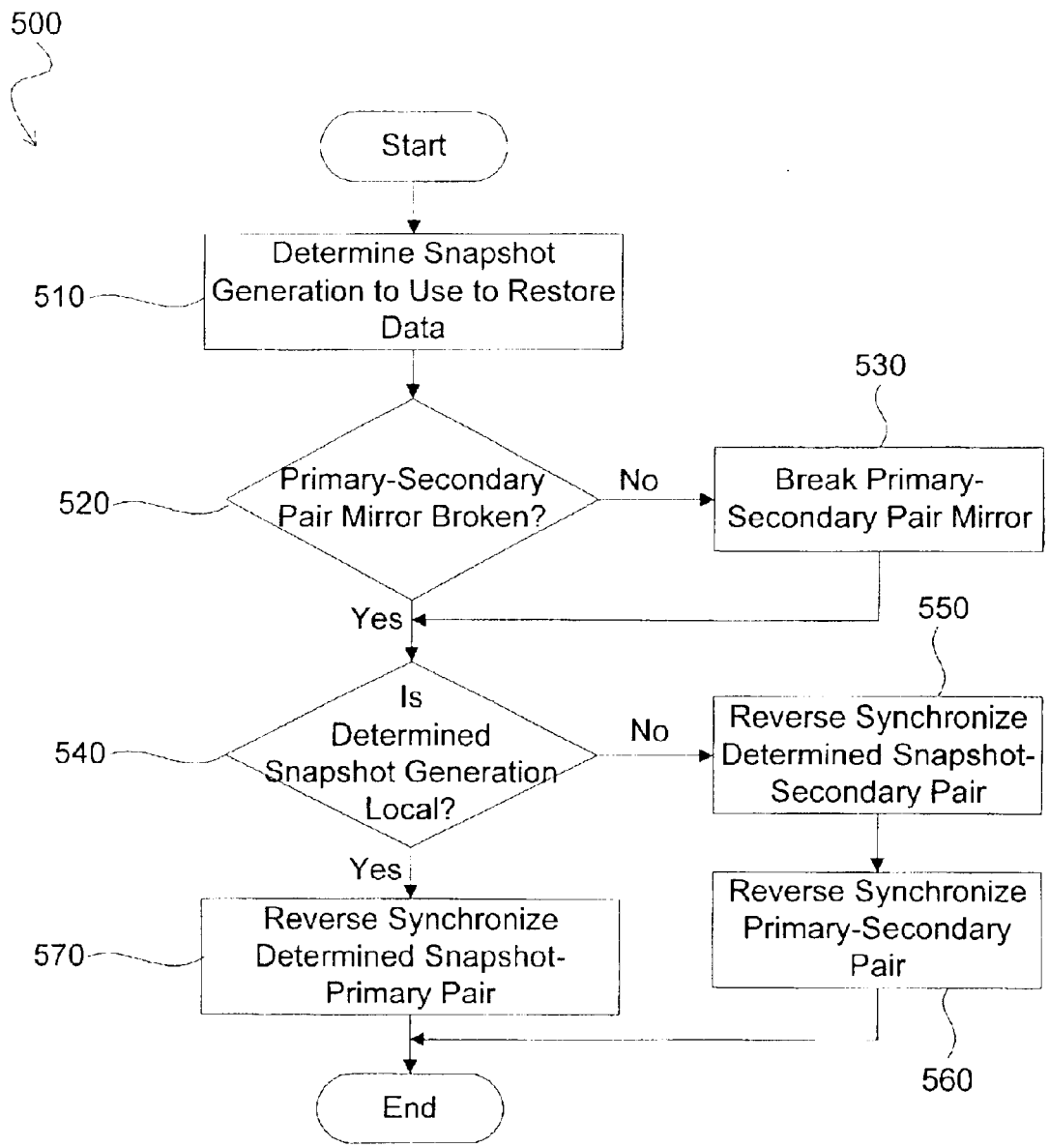
FIG. 5 is a flowchart illustrating a restore method according to an embodiment of the invention.

FIG. 5 is a flowchart illustrating a restore method 500 according to an embodiment of the invention. To restore data to primary storage device 125, e.g., after a disaster, a user determines (510) which snapshot generation to use to restore data to primary storage device 125. In an embodiment of the invention, engine 200 uses a pre-selected snapshot, such as the oldest snapshot, to restore data to primary storage device 125. Engine 200 then determines (520) if the connection 145 between primary storage device 125 and secondary storage device 155 is broken (i.e., disconnected). If the connection 145 is not disconnected, the engine 200 breaks (530) or disconnects the connection 145.

If the connection 145 is disconnected or after disconnecting the connection, the engine 200 determines (540) if the determined snapshot generation is stored locally, e.g., stored at local storage 120. The engine 200 makes this determination by looking at TOC 210, which stores snapshot generation location data. If the snapshot generation is stored locally and is determined to be viable (e.g., not damaged in a disaster), then the engine 200 reverse synchronizes (570) the locally stored snapshot from a local snapshot volume determined to hold the snapshot generation to the primary storage device 125, thereby restoring data to the primary storage device 125. The engine 200 can determine which local snapshot volume holds the snapshot generation by looking up the corresponding volume in TOC 210, which holds snapshot generation location. The method 500 then ends.

If the snapshot generation is not stored locally, the engine 200 reverse synchronizes (550) the remotely stored snapshot from a remote snapshot volume holding the snapshot generation to secondary storage device 155. The engine 200 determines which remote snapshot volume holds the snapshot generation by looking up the corresponding remote snapshot volume in TOC 210, which stores snapshot generation location. The engine 200 then reverse synchronizes the secondary storage device 155 to the primary storage 125, thereby restoring data to primary storage 125. The method 500 then ends.

The preceding has been a description of the preferred embodiment of the invention. It will be appreciated that deviations and modifications can be made without departing from the scope of the invention, which is defined by the appended claims.

What is claimed is:

1. A method, comprising:

mirroring data from a primary storage device at a first location to a secondary storage device at a second location;

taking a snapshot of the primary storage device and of the secondary storage device;

storing the primary storage device snapshot on a first snapshot volume at the first location;

storing the secondary storage device snapshot on a second snapshot volume at the second location;

updating a data structure to record backup times for the first and second snapshots and to record locations of the snapshots on the snapshot volumes;

repeating the mirroring, taking, storing the primary storage device snapshot, storing the secondary storage device snapshot, and updating so as to store multiple generations of snapshots;

selecting a snapshot to use to restore data to the primary storage device;

determining if the selected snapshot is stored at the first location;

if the selected snapshot is stored at the first location, restoring data to the primary storage device using the selected snapshot generation at the first location;

if the selected snapshot is not stored at the first location, synchronizing the secondary storage device with the selected snapshot generation at the second location and then restoring data to the primary storage device using data from the synchronized secondary storage device;

wherein the selecting selects a snapshot based on a user preference.

2. A computer-readable storage medium storing program code for causing a computer to perform the steps of:

mirroring data from a primary storage device at a first location to a secondary storage device at a second location;

taking a snapshot of the primary storage device and of the secondary storage device;

storing the primary storage device snapshot on a first snapshot volume at the first location;

storing the secondary storage device snapshot on a second snapshot volume at the second location;

updating a data structure to record backup times for the first and second snapshots and to record locations of the snapshots on the snapshot volumes;

repeating the mirroring, taking, storing the primary storage device snapshot, storing the secondary storage device snapshot, and updating steps so as to store multiple generations of snapshots;

selecting a snapshot to use to restore data to the primary storage device;

determining if the selected snapshot is stored at the first location;

if the selected snapshot is stored at the first location, restoring data to the primary storage device using the selected snapshot generation at the first location;

if the selected snapshot is not stored at the first location, synchronizing the secondary storage device with the selected snapshot generation at the second location and then restoring data to the primary storage device using data from the synchronized secondary storage device;

wherein the selecting selects a snapshot based on a user preference.

3. A method of backing up a first logical volume in a first storage subsystem to a second storage subsystem connected to the first storage subsystem via a path, the method comprising the steps of:

providing a second logical volume, a third logical volume, and a fourth logical volume in the second storage subsystem, the second logical volume being a copied logical volume of the first logical volume, the first and second logical volumes being in synch state, the third and fourth logical volumes being copied logical volumes of the second logical volumes, the second, the third and the fourth logical volumes being in synch state, and splitting the second logical volume from the first logical volume, splitting the third logical volume from the second logical volume, synchronizing the second logical volume with the first logical volume, splitting the second logical volume from the first logical volume, splitting the fourth logical volume from the second logical volume, and synchronizing the second logical volume with the first logical volume.

4. A system, comprising:

means for mirroring data from a primary storage device at a first location to a secondary storage device at a second location;

means for taking a snapshot of the primary storage device and of the secondary storage device;

means for storing the primary storage device snapshot on a first snapshot volume at the first location;

means for storing the secondary storage device snapshot on a second snapshot volume at the second location;

means for updating a data structure to record backup times for the first and second snapshots and to record locations of the snapshots on the snapshot volumes;

means for repeating the mirroring, taking, storing the primary storage device snapshot, storing the secondary storage device snapshot, and updating so as to store multiple generations of snapshots;

means for selecting based on a user preference a snapshot to use to restore data to the primary storage device;

means for determining if the selected snapshot is stored at the first location;

means for, if the selected snapshot is stored at the first location, restoring data to the primary storage device using the selected snapshot generation at the first location; and means for, if the selected snapshot is not stored at the first location, synchronizing the secondary storage device with the selected snapshot generation at the second location and then restoring data to the primary storage device using data from the synchronized secondary storage device.

5. A system for backing up a first logical volume in a first storage subsystem to a second storage subsystem connected to the first storage subsystem via a path, the system comprising:

a second logical volume, a third logical volume, and a fourth logical volume in the second storage subsystem, the second logical volume being a copied logical volume of the first logical volume, the first and second logical volumes being in synch state, the third and fourth logical volumes being copied logical volumes of the second logical volumes, the second, the third and the fourth logical volumes being in synch state, and means for splitting the second logical volume from the first logical volume, means for splitting the third logical volume from the second logical volume, means for synchronizing the second logical volume with the first logical volume, means for splitting the second logical volume from the first logical volume, means for splitting the fourth logical volume from the second logical volume, and means for synchronizing the second logical volume with the first logical volume.

* * * * *